United States Patent [19]

Murakami et al.

[11] Patent Number: 4,602,369

[45] Date of Patent: Jul. 22, 1986

[54] ELECTRONIC CALCULATOR CAPABLE OF CHECKING DATA IN A MEMORY UPON OPERATION OF A CLEAR KEY

[75] Inventors: Fumitune Murakami; Katsumi Saito, both of Tokyo, Japan

[73] Assignee: Casio Computer Co., Ltd., Tokyo, Japan

[21] Appl. No.: 600,509

[22] Filed: Apr. 16, 1984

[30] Foreign Application Priority Data

Apr. 20, 1983 [JP] Japan .................. 58-69562

[51] Int. Cl.$^4$ ............................................ G06F 11/00
[52] U.S. Cl. ...................................... 371/25; 371/21; 371/66; 371/67
[58] Field of Search ............. 371/21, 25, 66, 67; 364/200, 900, 715; 365/228

[56] References Cited

U.S. PATENT DOCUMENTS

| | | | |
|---|---|---|---|
| 3,781,797 | 12/1973 | Jinbo | 371/67 |
| 3,838,264 | 9/1974 | Maker | 371/21 |
| 3,921,142 | 11/1975 | Bryant | 371/21 |
| 3,931,507 | 1/1976 | Brantingham | 364/715 |
| 4,005,386 | 1/1977 | Seki | 364/900 |
| 4,211,915 | 7/1980 | Miller | 371/67 |
| 4,282,574 | 8/1981 | Yoshida | 371/66 |
| 4,475,180 | 10/1984 | Sekiya | 365/228 |
| 4,506,338 | 3/1985 | Danno | 371/67 |

*Primary Examiner*—Michael R. Fleming
*Attorney, Agent, or Firm*—Frishauf, Holtz, Goodman & Woodward

[57] ABSTRACT

A small piece of electronic equipment having an initializing function to be driven by a battery has an arthmetic memory and a special check data memory. When a specific key to designate the clear processing is operated in a key input section, it discriminates the checked data stored in the check data memory by an arithmetic operating section which judges if the check data has been replaced by another. If the checked data is found to be not replaced by another in accordance with its discrimination result signal, a control signal which allows the clear processing to clear the contents of the partial memory area of the arithmetic memory is generated by control circuits. If the checked data is found to be replaced by another, a control signal for permitting initialization processing to be executed is generated.

9 Claims, 3 Drawing Figures

ELECTRONIC CALCULATOR CAPABLE OF CHECKING DATA IN A MEMORY UPON OPERATION OF A CLEAR KEY

BACKGROUND OF THE INVENTION

The present invention relates to a small piece of electronic equipment having an initializing function to be driven by a battery which can adjust to any malfunction even in the case where the voltage from the battery varies.

Conventionally, for example, there is a small electronic calculator which is driven by a battery such as a solar battery or the like. However, voltage variation often occurs when the battery is being used causing a malfunction such as, for example, a flow runaway and memory data destruction or the like to occur. To adjust to such a malfunction, the following methods have been conventionally used.

(1) When the checked data which is preliminarily stored in a memory changes, initialization is automatically performed.

(2) As the C key (clear key) can always be input, when a flow runaway or the like occurs, initialization can be performed by the C key.

In the method of (1), software processing becomes more complicated since the check steps have to be interposed upon many portions of the flow and since the processing has to be returned to the check step each time processing is executed.

In addition, in the method of (2), the contents of the independent memory will also be cleared by the C key since the power-on clear processing is carried out by the C key. Therefore, the method of (2) has the inconvenience that it cannot be used in the small electronic calculator with an independent memory.

SUMMARY OF THE INVENTION

It is an object of the present invention to provide a small piece of electronic equipment having an initializing function to be driven by a battery wherein if the voltage variation of a battery causes a malfunction, the initialization processing can still be performed without burdening the software processing, and wherein the contents of an independent memory or the like that must not be ordinarily cleared by the C key is retained.

To accomplish the above object, a small piece of electronic equipment having an initializing function to be driven by a battery according to the present invention comprises: a key input means including at least a key for inputting operation data and a clear key for outputting a signal which designates clear processing; a memory means connected to said key input means for storing the data input by the operation of this key input means; a check data memory means for storing checked data to check a malfunction; reference data generating means for sequentially outputting reference data to be compared with the above checked data; a discriminating means connected both to the check data memory means and to this reference data generating means which compares the checked data with the reference data to see if the checked data has been replaced by another; a battery means for supplying a power to said respective means; and a control means which receives a discrimination result signal from the discriminating means by the operation of said clear key, and which generates control signals which allow either the clear processing or the initialization process to be executed in accordance with the contents of the memory means.

DETAILED DESCRIPTION OF THE PREFERRED EMBODIMENT

Figure 1:
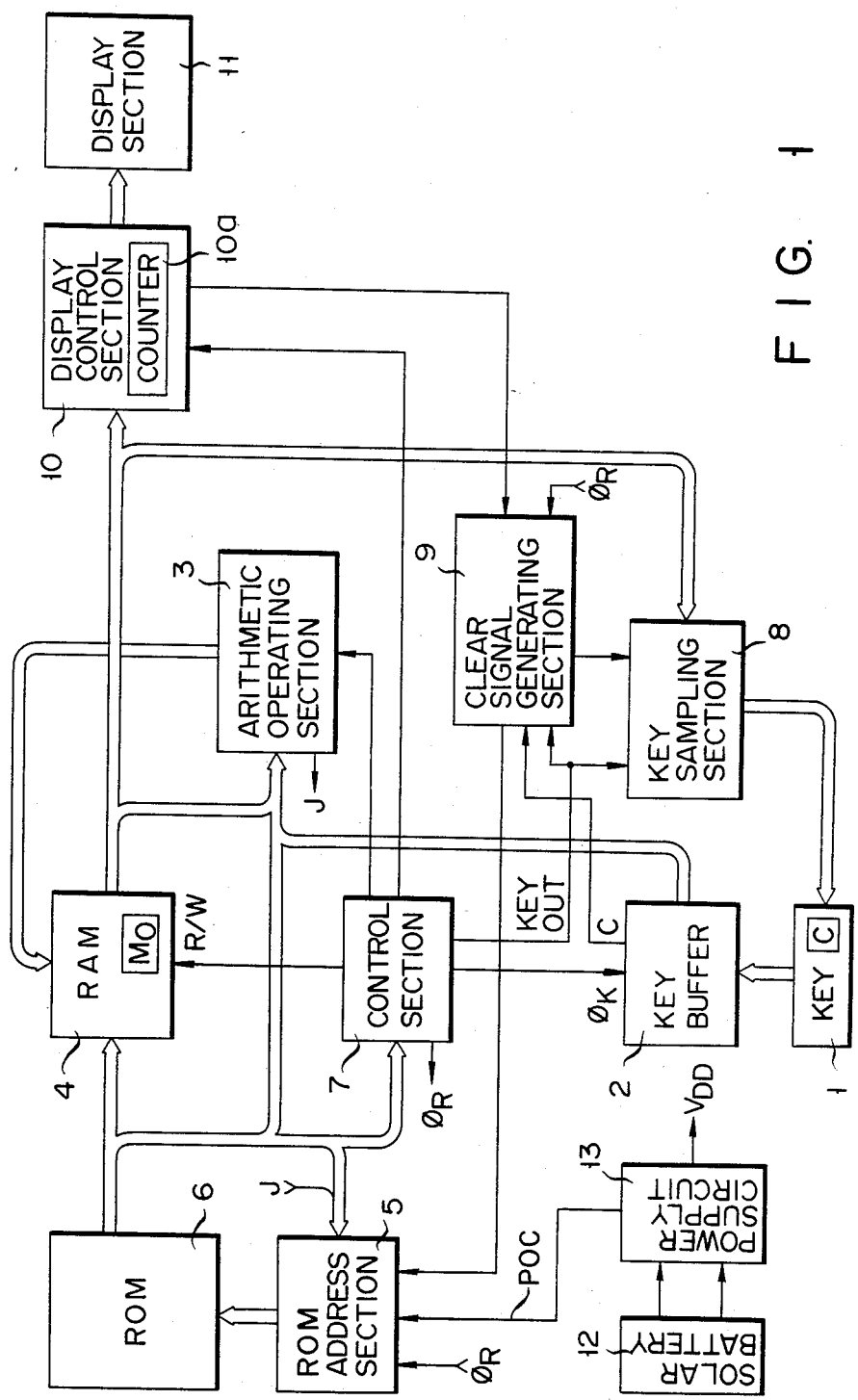
FIG. 1 shows a block circuit diagram of a piece of small electronic equipment according to the present invention.

One embodiment of the present invention will be described herein below with reference to the drawings. In FIG. 1, reference numeral 1 denotes a key input section with which key input data is temporarily stored in a key buffer 2 prior to being sent through an arithmetic operating section 3 to a RAM (random access memory) 4. In addition, numeral 5 indicates a ROM address section for designating an address location in a ROM (read only memory) 6. Various kinds of microprograms are stored in the ROM 6. An address data for the RAM 4, a numerical code, along with various instructions including the next address, etc., are output in accordance with the address designation of the ROM address section 5. The address data to be output from the ROM 6 is sent to the RAM 4; the numeric code is sent to the arithmetic operating section 3; various instructions are sent to a control section 7; and the next address is sent to the ROM address section 5. The control section 7 applies a readout/write instruction R/W to the RAM 4 in accordance with the instruction to be read out from the ROM 6. At the same time it applies an operation control instruction to the arithmetic operating section 3; a read timing signal $\phi_K$ of the key input data to the key buffer 2; an address update signal $\phi_R$ to the ROM address section 5; and a sampling signal output instruction Key Out to a key sampling section 8. When this key sampling section 8 receives the Key Out instruction, it produces a key sampling signal by decoding the data to be read out from the RAM 4 and sending it to the key input signal 1. In addition, the Key Out instruction to be output from the control section 7 is also sent to a clear signal generating section 9. Furthermore, a clear key operation signal C among the key input data from the key input section 1 is input through the key buffer 2 to this clear signal generating section 9. The address update signal $\phi_R$ from the control section 7 is also input thereto. This clear signal generating section 9 gives a timing signal for the operation output of the C key (clear key) of the key input section 1 through the key sampling section 8. In the case where the clear key operation signal C is given through the key buffer 2, the generating section 9 also generates the clear signal in accordance with a predetermined condition and outputs it to the ROM address section 5. The RAM 4 has a check data memory section Mo. Specifically checked data, e.g., "1 0 1 0" can be prestored in this check data memory section Mo by the operation of the key input section 1. Reference data to be compared with the above specifically checked data is output from the ROM 6, and is compared with the checked data from the check data memory section Mo by the discriminating means which is included in the arithmetic operating section 3 and which judges if the checked data has been replaced by another. The discriminating means also discriminates the presence or absence of data for the operation result. A signal J representing the discrimination result from the discriminating means is output to the ROM address section 5. The data to be read out from the RAM 4 is sent to the arithmetic operating section 3 and also to a display control section 10. This display control section 10 is made operative in response to the control signal from the control section 7, and allows the data from the RAM 4 to be transmitted to a display section 11 for display. At the same time, the display control section 10 sends the output of a counter for a common signal as a timing signal to the clear signal generating section 9. In addition, numeral 12 indicates a solar battery whose output is sent to a power supply circuit 13. This power supply circuit 13 detects the leading edge of the output voltage of the solar battery 12 and generates a power-on clear signal POC which it sends to the ROM address section 5. Also, the power supply circuit 13 smoothes the output of the solar battery 12 to obtain a power voltage $V_{DD}$ having a predetermined level which it supplies as the operating voltage to each section.

Figure 2:
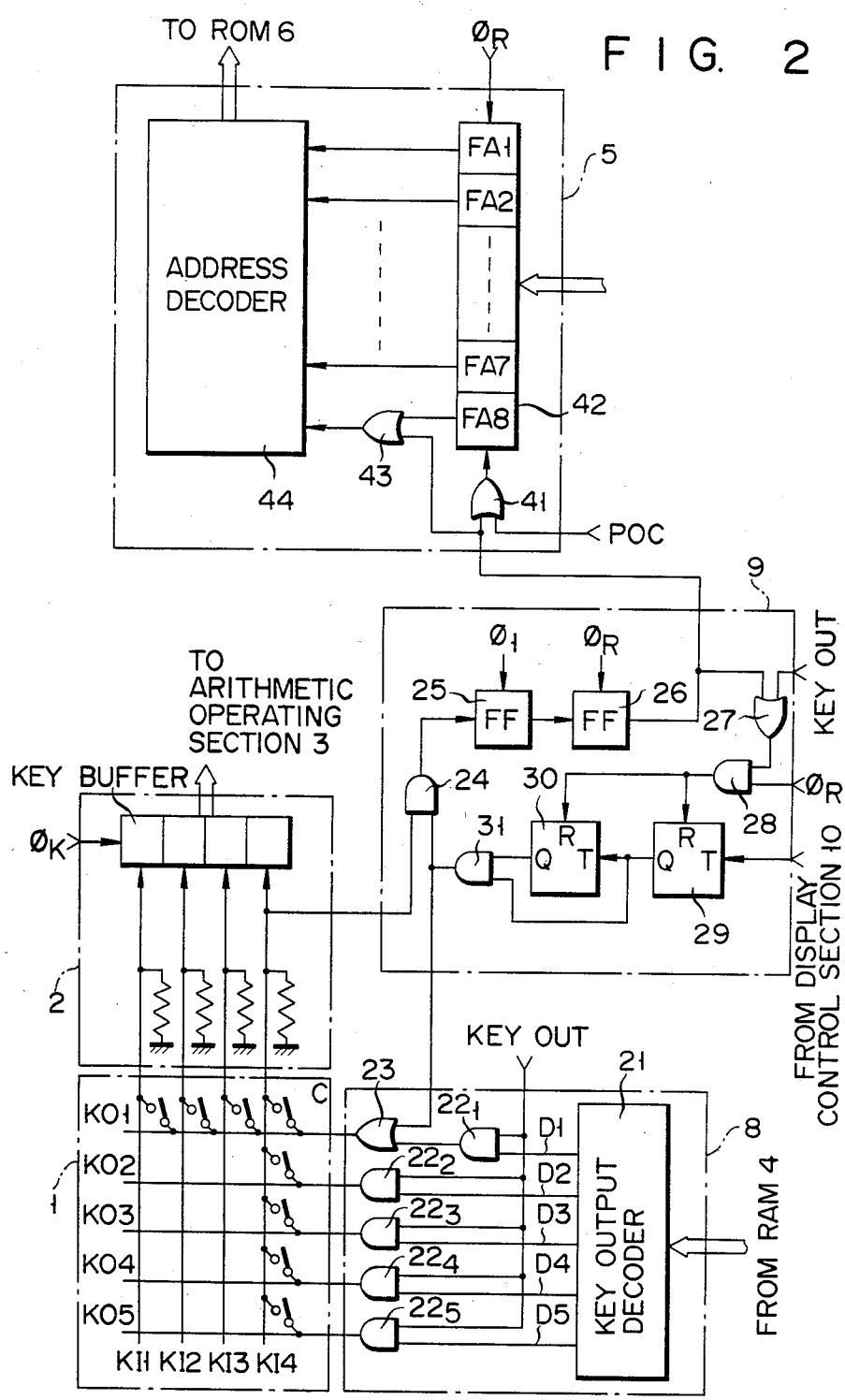
FIG. 2 shows a schematic diagram of a practical circuit for several of the blocks shown in FIG. 1.

The key input section 1, key buffer 2, ROM address section 5, key sampling section 8, and clear signal generating section 9 will next be described in detail with reference to FIG. 2. The key sampling section 8 is provided with a key output decoder 21 for decoding the data from the RAM 4 thereby obtaining 5-bit decoded outputs $D_1$–$D_5$. These decoded outputs $D_1$–$D_5$ are input to AND circuits $22_1$–$22_5$ whose gates are controlled by the Key Out instruction from the control section 7. An output of the AND circuit $22_1$ is sent to the key input section 1 through an OR circuit 23, while outputs of the other AND circuits $22_2$–$22_5$ are directly sent to the key input section 1. This key input section 1 comprises row lines $KO_1$ to $KO_5$ in which the signal from the key sampling section 8 is input, and column lines $KI_1$ to $KI_4$ from which the key input data is output. A key switch is provided at each of the intersections of the row lines $KO_1$ to $KO_5$ and column lines $KI_1$ to $KI_4$. In this case, the clear key C is provided as a key switch at the intersection of the row line $KO_1$ and column line $KI_4$. The key input signals to be output from the column lines $KI_1$–$KI_4$ of the key input section 1 are transmitted to the key buffer 2 which is constituted of four bits. This key buffer 2 reads the input synchronously with the timing signal $\phi_K$ and outputs its holding data to the arithmetic operating section 3 as described above. In addition, the data from the column line $KI_4$ connected to the clear key C, which is one of the items of data to be input from the key input section 1 to the key buffer 2 is supplied to an AND circuit 24 in the clear signal generating section 9. The output of this AND circuit 24 is input to a flip-flop 25 which operates synchronously with a clock pulse $\phi_1$. The output of this flip-flop 25 is read in a flip-flop 26 synchronously with the address update signal $\phi_R$ and is sent as the clear signal to the ROM address section 5 at the same time it is input to an OR circuit 27. The Key Out instruction is also input to this OR circuit 27. Its output together with the address update signal $\phi_R$ is input to an AND circuit 28. An output of this AND circuit 28 is input to the reset terminals R of the T-type flip-flops 29 and 30. The output of a counter 10a for the common signal is input from the display control section 10 to a trigger terminal T of the flip-flop 29. The output of the flip-flop 29 is input to a trigger terminal T of the flip-flop 30 as well as to an AND circuit 31. In addition, the output of the flip-flop 30 is given to this AND circuit 31. The output of the AND circuit 31 is input to the AND circuit 24 and also to the OR circuit 23 in the key sampling section 8.

The clear signal which was sent from the flip-flop 26 to the ROM address section 5 is input through an OR circuit 41 to a reset terminal of an address register 42, and is also input through an OR circuit 43 to an address decoder 44. The address register 42 is constituted by eight bits consisting of $F_{A1}$–$F_{A8}$. It temporarily stores the next address data from the ROM 6 in response to the address update signal $\phi_R$. The bits of $F_{A1}$–$F_{A4}$ to be written in the address register 42 are the data for designating the address, while the bits of $F_{A5}$–$F_{A8}$ are the data for designating the page. The bits of $F_{A1}$–$F_{A7}$ among the data written in the address register 42 are directly sent to the address decoder 44, while the bit of $F_{A8}$ is sent through the OR circuit 43 to the address decoder 44. Although the address decoder 44 designates the address of the ROM 6 in accordance with the input data when all of the 8-bit inputs are 0, it also designates the head address of the program to execute the initialization processing for clearing the contents of all the memories including the independent operating memory. In the case where the input corresponding to the bit of $F_{A8}$ of the address register 42 is 1 and where all of the other inputs are 0, the address decoder 44 specifies the head address of the program to perform the clear processing to only clear the contents of the partial memory area.

Figure 3:
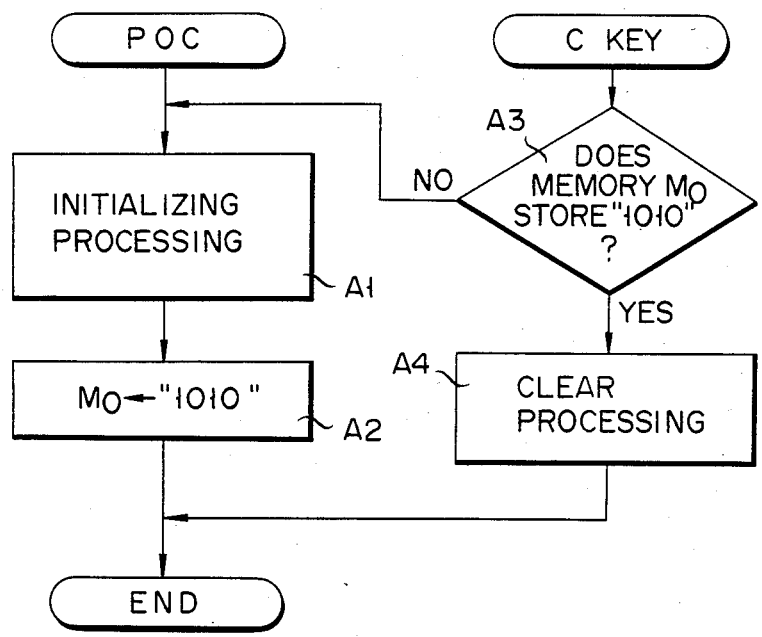
FIG. 3 shows a flow chart to describe the operation of the present invention.

The operation of the above embodiment will now be described in accordance with the flow chart shown in FIG. 3. In the ordinary operation, key sampling data to be output from the RAM 4 is sent to the key sampling section 8 to be decoded by the key output decoder 21. Then it is sent to the key input section 1 through the AND circuits $22_1$–$22_5$ in response to the Key Out instruction. At this time, by performing the key operation in the key input section 1, its key operation signal is temporarily stored in the key buffer 2 and is written in the RAM 4 through the arithmetic operating section 3. On the other hand, in the ROM address section 5, the next address data from the ROM 6, the discrimination result signal J from the arithmetic operating section 3, and the like are read in the address register 42 synchronously with the address update signal $\phi_R$ and are decoded by the address decoder 44, thus designating the address of the ROM 6. This means that when the output voltage of the solar battery 12 decreases significantly due to the absence of light, it thereafter will recover to a predetermined level, and the power-on clear signal POC will be output from the power supply circuit 13. This power-on clear signal POC is sent to the ROM address section 5 to reset the address register 42. Thus, all the bits $F_{A1}$–$F_{A8}$ of this address register 42 become 0, and the address decoder 44 will specify the head address of the initialization processing program for the ROM 6. Due to this, the ROM 6 starts the control operation and executes the initialization processing as shown in step $A_1$ in FIG. 3. In this initialization processing, the memory contents of the arithmetic register, the independent memory, etc. provided in the RAM 4 are also cleared. Next, the processing advances to step $A_2$. The checked data, e.g., "1 0 1 0", is written in the check data memory section Mo in the RAM 4 for the next flow and the processing is finished. Thereafter, the registration processing, operation processing, etc. are carried out in accordance with the key input data.

When the Key Out instruction is given from the control section 7 to the clear signal generating section 9, a "1" signal is output from the AND circuit 28 synchronously with the address update signal $\phi_R$ so that the flip-flops 29 and 30 are reset. Thereafter, the flip-flops 29 and 30 sequentially perform the inverting operations in response to output from the counter 10a to make a common signal to be sent from the display section 10. When both outputs of the flip-flops 29 and 30 become "1", a "1" signal is output from the AND circuit 31, and is input to the AND circuit 24 and the OR circuit 23 of the key sampling section 8. Namely, the "1" signal and "0" signal each having fixed times are alternately output from the AND circuit 31, and are then input to the AND circuit 24 and to the OR circuit 23. When the C key is operated after a predetermined arithmetic operation has finished, or even when ordinary key operation is performed during a flow runaway or the like, its key operation is not effectively input, and a "1" signal is output from the OR circuit 23 through the C key to the column line KI$_4$ when the output of the AND circuit 31 is "1". This "1" signal is sent from the key buffer 2 to the clear signal generating signal 9 and is read through the AND circuit 24 into the flip-flop 25 in response to the clock pulse $\phi_I$. As mentioned above, when the C key is operated, the key operation signal flows through a resistor into the grounding line in the key buffer 2. However, since the output of the AND circuit 31 is a signal having a constant duty, power consumption decreases. The data held in the flip-flop 25 is shifted to the flip-flop 26 synchronously with the address update signal $\phi_R$. Its output is transmitted as the clear signal to the ROM address section 5. In addition, the output of the flip-flop 26 is input through the OR circuit 27 to the AND circuit 28. Therefore, the output of the AND circuit 28 becomes 1 synchronously with the address update signal $\phi_R$, causing the flip-flops 29 and 30 to be reset. The clear signal which was sent from the flip-flop 26 to the ROM address section 5 resets the address register 42 through the OR circuit 41, and is also input to the address decoder 44 through the OR circuit 43. Therefore, with respect to the inputs to the address decoder 44, the corresponding bits of FA$_1$–FA$_7$ of the address register 42 become 0; the corresponding bit of FA8 becomes 1; and the address decoder 44 specifies the head address for executing the discriminating program shown in step A$_3$ in FIG. 3 for the ROM 6. Consequently, the ROM 6 reads out the memory data from the check data memory section Mo in the RAM 4 into the arithmetic operating section 3. The checked data "1 0 1 0" which has been written first is checked to see if it has been explaced by another. If this checked data is retained, the processing will advance to step A$_4$ to execute the clear processing. Although the arithmetic register and the like are cleared in this clear processing, clear processing is not performed for the independent memory, so the contents of the independent memory are retained. However, in step A$_3$, if the checked data is found to not be held, the initialization processing shown in step A$_1$ will be carried out. Namely, in the case where the checked data has changed, it is discriminated that the contents of the independent memory were also destroyed so that clear processing can also be performed, even for an independent memory. Thereafter, in step A$_2$, the correctly checked data "1 0 1 0" is written in the check data memory section Mo, and the processing is finished.

In addition, although the checked data has been stored in the special area Mo provided in the RAM 4 in the above embodiment, it is not limited to this. The checked data may also be stored within any other separate memory.

Also, the key-in of the C key is not limited to the above embodiment. In brief, it may be possible to use the C key for inputting at any time except during a flow runaway or key sampling.

What is claimed is:

1. An electronic calculator capable of checking data in a memory upon operation of a clear key, comprising:
   key input means including at least a key for inputting operation data and a clear key for outputting a signal to designate clear processing;
   memory means connected to said key input means for storing the data input by the operation of said key input means;
   check data memory means for storing checked data to check a malfunction;
   reference data generating means for outputting reference data to be compared with the checked data;
   battery means for supplying power and generating a signal representative of a recovery toward normal battery voltage;
   discriminating means, connected to both said check data memory means and said reference data generating means, for comparing the checked data with the reference data to see if the checked data has been changed due to a voltage drop in said battery means;
   clear processing means, connected to said memory means, for clearing part of said memory means;
   initialization processing means, connected to said memory means, for initializing said memory means;
   control means coupled to said battery means, said check data memory means, said clear processing means and said initialization processing means for writing the reference data generated from said reference data generating means into said check data memory means when power is supplied from said battery means, for receiving a discrimination result signal from said discriminating means when said clear key is operated, and for generating a control signal in response to the discrimination result signal to cause one of said clear processing means and initialization processing means to perform the associated process.

2. An electronic calculator according to claim 1, wherein said check data memory means is connected to said reference data generating means and stores the special checked data output from said reference data generating means.

3. An electronic calculator according to claim 1, wherein said memory means and said check data memory means constitute a RAM.

4. An electronic calculator according to claim 1, wherein said control means is comprised of an address decoder means which receives the discrimination result signal from said discriminating means and which generates an address signal for designating the address of said reference data generating means; and a control section means which receives a fixed signal generated from said reference data generating means by receiving said address signal and which generates control signals to allow either the clear processing or initialization processing to be performed in accordance with the memory content of said memory means.

5. An electronic calculator according to claim 1, wherein said key input means is connected to a clear signal generating section and enables the clear key to operate in response to a signal which is always output from said clear signal generating section.

6. An electronic calculator according to claim 5, wherein said clear signal generating section includes circuit means for controlling a key operation output signal of said clear key in said key input means in response to its intermittent waveform output signal.

7. An electronic calculator according to claim 1, wherein said reference data generating means is constituted by a ROM.

8. An electronic calculator according to claim 1, wherein said battery means is a solar battery.

9. An electronic calculator according to claim 1, wherein said memory means includes an arithmetic register and a temporary memory register for storing operation results temporarily, and said discriminating means consists of an arithmetic circuit and has a computing function.

* * * * *